United States Patent
Schrotenboer

(10) Patent No.: US 7,730,693 B2
(45) Date of Patent: Jun. 8, 2010

(54) DECKING SYSTEM

(75) Inventor: Richard L. Schrotenboer, Zeeland, MI (US)

(73) Assignee: Jimdi, Inc., Allendale, MI (US)

( * ) Notice: Subject to any disclaimer, the term of this patent is extended or adjusted under 35 U.S.C. 154(b) by 1724 days.

(21) Appl. No.: 10/840,957

(22) Filed: May 7, 2004

(65) Prior Publication Data
US 2005/0039413 A1 Feb. 24, 2005

Related U.S. Application Data

(60) Provisional application No. 60/469,477, filed on May 9, 2003.

(51) Int. Cl.
 F16D 1/00 (2006.01)
 E04B 2/30 (2006.01)
 E04B 5/00 (2006.01)
(52) U.S. Cl. .................... 52/650.3; 52/489.1; 52/592.1; 52/357; 403/381
(58) Field of Classification Search ................. 52/650.3, 52/537, 588.1, 592.1, 506.05, 509, 510, DIG. 5, 52/489.1, 489.2, 357, 582.1, 700, 266, 241; 403/363, 381, 331
See application file for complete search history.

(56) References Cited

U.S. PATENT DOCUMENTS

| | | | | |
|---|---|---|---|---|
| 3,528,391 A | * | 9/1970 | Johnson | 119/529 |
| 3,722,473 A | * | 3/1973 | Vickstrom et al. | 119/529 |
| 4,077,334 A | * | 3/1978 | Svirklys | 108/56.1 |
| 4,078,515 A | * | 3/1978 | Svirklys | 114/266 |
| 4,703,597 A | * | 11/1987 | Eggemar | 52/220.2 |
| 5,048,448 A | | 9/1991 | Yoder | |
| 5,553,427 A | | 9/1996 | Andres | |
| 5,642,592 A | | 7/1997 | Andres | |
| 5,735,097 A | * | 4/1998 | Cheyne | 52/489.1 |
| 5,881,508 A | * | 3/1999 | Irvine et al. | 52/177 |
| 5,950,377 A | * | 9/1999 | Yoder | 52/177 |
| 5,953,878 A | | 9/1999 | Johnson | |
| 6,112,479 A | | 9/2000 | Andres | |
| 6,233,886 B1 | * | 5/2001 | Andres | 52/177 |
| 6,314,699 B1 | | 11/2001 | West | |
| 6,324,796 B1 | | 12/2001 | Heath | |
| 6,584,748 B2 | * | 7/2003 | Bresnahan | 52/650.3 |
| 6,594,961 B2 | | 7/2003 | Leines | |
| 6,637,163 B2 | * | 10/2003 | Thibault et al. | 52/177 |
| 6,651,398 B2 | | 11/2003 | Gregori | |
| 6,694,681 B1 | | 2/2004 | Andres | |
| 2002/0056238 A1 | | 5/2002 | Leines | |
| 2002/0059766 A1 | | 5/2002 | Gregori | |
| 2003/0009973 A1 | * | 1/2003 | Lee | 52/589.1 |
| 2003/0101673 A1 | | 6/2003 | West et al. | |
| 2003/0110727 A1 | | 6/2003 | Gregori | |
| 2004/0079041 A1 | | 4/2004 | Bergeron et al. | |

* cited by examiner

Primary Examiner—Richard E Chilcot, Jr.
Assistant Examiner—Elizabeth A Plummer
(74) Attorney, Agent, or Firm—Kane & Co., PLC; Barry C. Kane

(57) ABSTRACT

A floor panel and method of manufacturing wherein each panel comprises a sheet having at least two stiffening members extending from the lower surface and substantially the length of the sheet. A bead is defined along one of the stiffening members while a tab is defined along the other stiffening member. Clips are provided to fasten the bead and tab in a locking relationship to hold the sheet in position. A flange formed at one end of the panel is received within a recess formed at an opposite end of another panel to automatically space one panel from another.

16 Claims, 3 Drawing Sheets

DECKING SYSTEM

CROSS REFERENCE TO RELATED APPLICATION

This application claims priority of U.S. Provisional Patent Application No. 60/469,477 filed 9 May 2003, the contents of which are incorporated herein by reference.

BACKGROUND OF THE INVENTION

1. Field of the Invention

This invention relates to building materials. In particular, the invention concerns an improved panel system, and more particularly the invention relates to a panel system for use as flooring or decking.

2. Discussion of the Related Art

Traditionally, building materials consist of various forms of natural resources, such as stone, wood, and clay. More recently, man-made materials have been introduced. There has been an increase on the demand for man-made materials substituting polymeric materials for wood products. Certain companies have combined a mixture of polymers and wood chips and/or dust and extruded this mixture to form long planks. Once cured, these planks have been used as decking materials and at times used for outdoor furniture. However, a major disadvantage associated with these types of wood substitutes is the coefficients of expansion and contraction for the polymeric material. Often, the expansion and contraction is so substantial that the planks buckle and/or leave substantial gaps from shrinkage. The purpose of this invention is to provide a polymeric decking system that accommodates the shrinkage and expansion of the polymeric material produced by changes in temperature.

SUMMARY OF THE INVENTION

According to one form of the invention, a floor panel assembly is provided having a tabular sheet defined by an upper surface, a lower surface, and a common peripheral edge. At least two spaced apart stiffening members extend from the lower surface and run substantially the length of the tabular sheet. A bead is defined along a free edge of one stiffening member while a tab extends from the free edge of the opposite stiffening member.

In a further embodiment of the invention, a plurality of clips are included, each of which is adapted to be fastened to a substrate and receive a one of the free edges in locking relationship for holding said tabular sheet in position. The two stiffening members extending from said lower surface of the tabular sheet and having the bead and tab preferably have a height less than other stiffening members to account for the height of the mounting clips. To help facilitate the location of each panel, a plurality of spacing bosses are defined at predetermined intervals along the length of one of the bead and tab. The bosses restrict the longitudinal movement of each panel during periods of expansion and contraction.

In another embodiment of the panel, and to help automatically facilitate spacing, a tapered flange is located at one end of each panel. Likewise, a corresponding recess is defined in the opposite end of another panel to receive the tapered flange. To provide a finished appearance along an edge of the floor, a finishing panel is provided having a vertical member depending from the lower surface proximate one end and at an angle to the stiffening members.

In yet another embodiment, each of the clips include a dedicated recess for receiving a respective one of the bead and the tab at the ends of the stiffening members. Moreover, on each of the plurality of clips, the recess for the tab is outboard of the recess for said bead. In the alternative, and depending upon the desired configuration the dedicated recess for the bead is outboard of the recess for the tab.

In another embodiment of the invention, a decking system is provided comprising a plurality of decking panels adapted to be arranged in a predetermined array over a predetermined substrate. Each of the plurality of decking panels includes an upper surface of predetermined extant and an opposing lower surface of substantially equal extant joined to the upper surface by a shared peripheral edge. At least two, spaced apart, and generally parallel stiffening members are defined extending from the lower surface and run substantially along the length of each panel to provide structural rigidity. One of the stiffening members includes a bead of predetermined geometric cross-section defined along a free edge. The opposite one of the stiffening members includes a projection defined along a free edge thereof to assist in fixing the relative position of each panel. Mounting is actually accomplished by a plurality of clips, each constructed to be rigidly fixed to the substrate and receive one of the bead and the projection extending from one of the stiffening members. To help in positioning the panel, a plurality of spacing bosses are spaced at predetermined intervals along one of the bead and the projection. To help provide a rigid surface, a third stiffening member extends from the lower surface and is positioned intermediate the two stiffening members mentioned earlier. One end of each panel terminates in a tapered flange. The opposite end of each panel includes a recess for receiving the tapered flange of another panel.

In yet another form of the invention, a method for manufacturing the decking or floor panel is provided and comprises the steps of producing a panel of predetermined dimension with an upper surface and a lower surface sharing a common peripheral edge. At least two spaced apart stiffening members are defined extending substantially perpendicular from the lower surface of said panel. The method further includes the steps of forming one of a bead and a projection along a free edge of one of the stiffening members, and an opposite one of the bead and projection on a free edge of the other stiffening member.

A further embodiment of the method includes forming a tapered flange at one end of the panel which adapted to be received within a recess formed at an opposite end of another panel. The tapered flange is formed in a manner to automatically space the end of one panel from the end of an adjoining panel. In a preferred embodiment, each of the panels is formed using one of the methods of injection molding, extrusion molding, machining, forging and casting. Likewise, the plurality of clips are formed separate and apart from the panels so that each is configured to be anchored to a substrate. Each of the clips is formed with a plurality of attachment members adapted to receive a respective one of the bead and the projection to retain the panel to the substrate. The method further comprises forming a plurality of spacing bosses at predetermined intervals along one of the bead and the projection. To help provide longitudinal stability, each clip is adapted to be received between a pair of spacing bosses.

These and other features, advantages and objects of the present invention will be further understood and appreciated by those skilled in the art by reference to the following specification, claims and appended drawings.

DETAILED DESCRIPTION OF THE INVENTION

Figure 2:
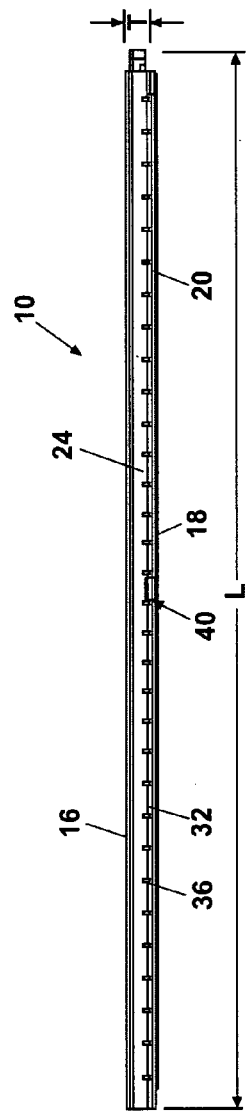
FIG. 2 is a side elevational view of one embodiment of a panel of the invention.
Figure 3:
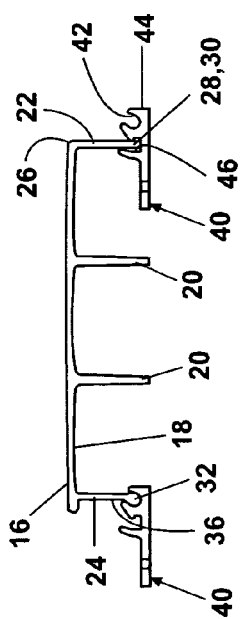
FIG. 3 is an end elevational view of the panel shown in FIG. 2.
Figure 5:
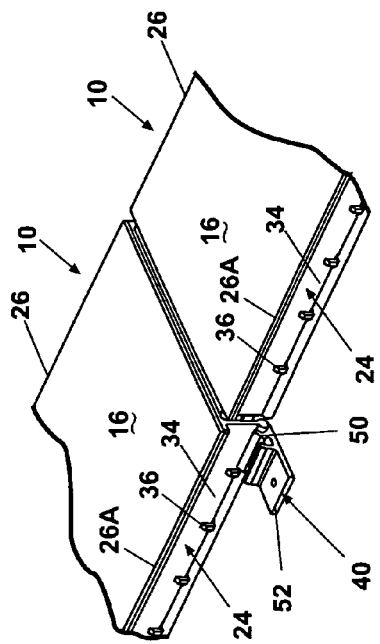
FIG. 5 is a fragmentary oblique view illustrating adjoining ends of panels.
Figure 4:
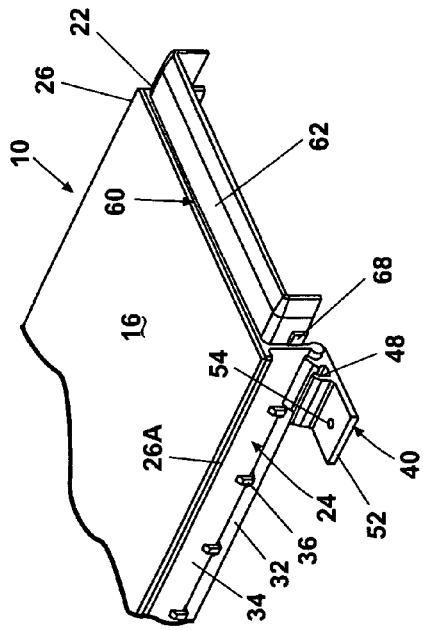
FIG. 4 is a fragmentary oblique view of one end of a panel of the invention.
Figure 6:
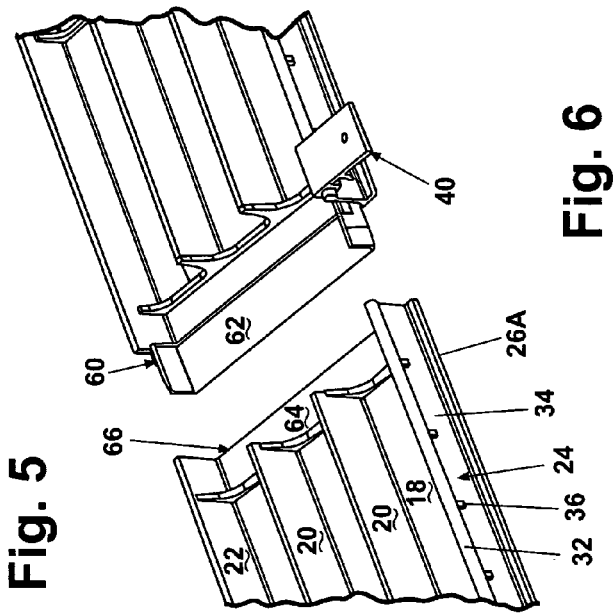
FIG. 6 is a fragmentary oblique view illustrating the underside of two adjacent end panels.

For purposes of the following description, the terms "upper," "lower," "left," "rear," "front," "vertical," "horizontal" and derivatives of such terms shall relate to the invention as oriented in FIGS. 2 and 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the inventive concepts of this invention. Specific dimensions and other physical characteristics relating to the embodiments disclosed herein are not to be considered as limiting unless expressly stated otherwise.

Figure 1:
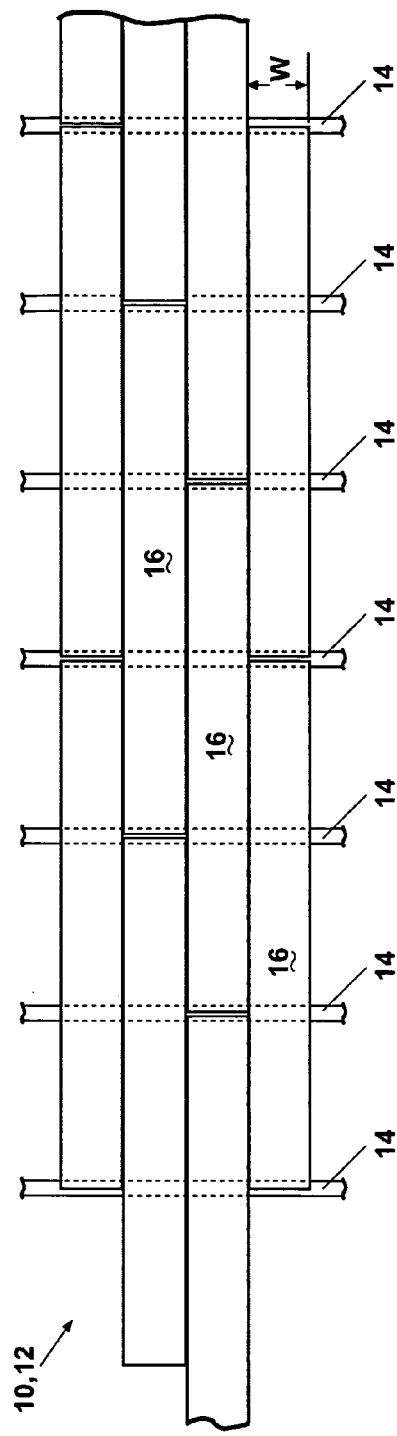
FIG. 1 is a fragmentary plan view illustrating one possible pattern for the planking material of this invention.

The instant invention comprises an improved decking and flooring material in the form of three dimensional tabular sheets or planks 10 having a length substantially greater than its width which in turn is substantially greater than the thickness. In a preferred embodiment, each of the tabular sheets may be formed using one of injection molding and extrusion of a polymeric material. For example, the reader is referred to FIGS. 1 through 3 illustrating an injection molded polymeric structure having a length (L) on the order of 48 inches, a width (W) of approximately 6 inches, and a height (H) ranging between 1 and 1½ inches. As shown in FIG. 1, a number of panels 10 are assembled together to form a panel assembly 12. In the panel assembly 12 each of the tabular sheets or planks 10 are arranged longitudinally adjacent each other and supported by perpendicularly arranged joists 14 spaced at predetermined intervals or other suitable substrate. In this case, the spacing between the joists 14 has been established at 16 inches-on-center. Although the joists 14 are spaced 16 inches-on-center, the spacing may be changed depending in large part upon the length of each of the tabular sheets or planks 10. As briefly mentioned above, other suitable substrates may include steel or aluminum beams, plywood sheeting, concrete or other stable surface.

FIGS. 2 and 3 generally illustrate one embodiment of structural features in each tabular sheet or plank 10. As briefly mentioned above, each tabular sheet or plank 10 is preferably injection molded or extruded from a polymeric material. One example of a suitable material includes polyvinyl chloride, although other materials may also be used so long as they provide stability to ultra violet radiation and maintains their integrity at hot and cold temperatures. In the embodiment illustrated in this application, each plank 10 contains an upper surface 16, a lower surface 18 and a plurality of longitudinal stiffening members 20, each extending substantially perpendicular from the lower surface 18. Outboard of longitudinal stiffening members 20 are plank sidewalls 22 and 24 which also extend the length of each plank. As best illustrated in FIG. 3, sidewall 22 depends from the lower surface 18 substantially at the peripheral edge 26 of surfaces 16 and 18. Moreover, the vertical height (H) of sidewall 22 is slightly less than that of the inboard longitudinal stiffening members 20 for reasons which will become immediately apparent below. The lower terminal edge of sidewall 22 includes a lateral extension running the length of the sidewall 22 defined by a shoulder 28 and tapered vertical wall 30 to define a tab structure. The sidewall 24 extending downwardly from lower surface 18 on the opposite side of the plank 10 is offset laterally inward from the peripheral edge 26a of surfaces 16 and 18. The lower end of sidewall 22 terminates in a longitudinal bead 32 which extends substantially along the length of the plank 10. The particular transverse form of longitudinal bead 32 may vary so long as the requisite function is performed. For example, the bead may be in the form of a substantially linear post, a polygon, or even an oval or circle.

Spaced periodically along the outer surface 34 of sidewall 24 and extending from the upper portion of the bead 32 onto the sidewall 24 is a spacing boss 36. In a preferred embodiment, the distance between each spacing boss 36 is narrowest toward a transverse middle portion of each panel, and increases as one moves toward one of the opposing ends of the plank 10. For example, the distance between the spacing bosses 36 at the center of the plank may be on the order of one inch and on the order of one and one-half inch at the ends of the plank 10.

Each plank 10 is anchored to the underlying joist 14 by a plurality of clips 40 generally identified by reference numeral 40. Each clip 40 is substantially tabular in shape with a substantially cylindrical recess 42 extending along edge 44. Immediately adjacent the cylindrical recess 42 and inboard from edge 44 is a second recess 46 defined by inclined wall 48 and shoulder 50. Spaced from the recesses 42 and 46, and proximate the opposing edge 52 are one or more perforations 54 for receiving a screw, nail, or other anchor for attaching the clip 40 to the joists 14. Additional attachment methods for rigidly attaching each of the plurality of clips may include one of a screw, a rivet, a bolt, an adhesive, a clamp, and a pinch flange. In a preferred embodiment, the width of each clip 40 is substantially the same, and slightly less than the minimal distance between the spacing bosses 36. In particular, for the example described above, it is preferred that the width of the clip 40 be less than one inch. As best illustrated in FIG. 3, a plurality of clips 40 are used to anchor each plank 10 to the joist 14 by sidewall 22 and shoulder 28 received within the recess 46 to engage shoulder 50, thus keeping that portion of plank 10 securely anchored against the joist 14. On the opposite sidewall 24, the longitudinal bead 32 is received within the recesses 42 of each of the plurality of clips 40 spaced along the length of each plank and anchored to the underlying joist 14. The recess 42 in turn is received in snap fit arrangement around the bead 32 to retain the sidewall 24 against the joists 14. The difference in height between the longitudinal stiffening members 20 and the outboard sidewalls 22 and 24 are compensated by the thickness of the tabular portions of the clips 40. It should be noticed that the spacing between the recess 46 and the cylindrical recess 42 are such that outside wall 22 may be positioned in a fixed spaced relationship with respect to sidewall 24 of the adjacent plank 10 to ensure even spacing between the adjoining planks. The distance between each of the spacing bosses 36 and the clips 40 provides adequate room for each plank to expand and contract in a direction parallel to the longitudinal axis.

Returning to FIGS. 1 and 4 through 6, the instant invention also accommodates for expansion between the ends of adjacent planks 10. Referring to the referenced drawing figures, a first end 60 of each plank 10 includes a tapered flange 62 positioned slightly lower than the upper surface 16 and slightly inboard of each sidewall 22, 24. Each tapered flange 62 is dimensioned to be received within a dimensionally close fitting recess 64 defined in the second end 66 of the adjacent plank 10. The dimension of the tapered flange 62 is sufficient to continue to span the gap between adjacent planks 10 when each plank 10 has retracted to its maximum extent in cold weather, and more than adequate to span the distance when each plank has reached its maximum point of expansion. Appropriate spacing between the ends of the respective planks 10 is automatically provided by a tab 68 molded onto the tapered flange 62 to space the first end 60 relative to the second end 66.

Figure 7:
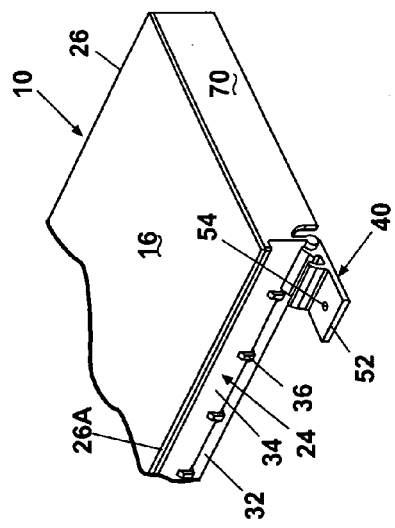
FIG. 7 is a fragmentary oblique view illustrating an end or cap wall of a panel of the invention.
Figure 8A:
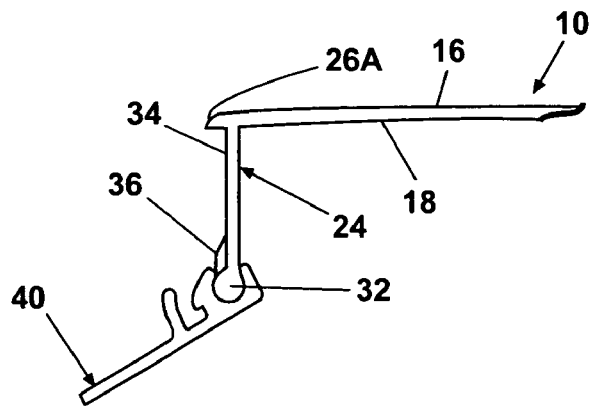
FIGS. 8a, 8b, 8c, and 8d schematically illustrate assembly relationships between laterally adjacent panels of the invention.
Figure 8B:
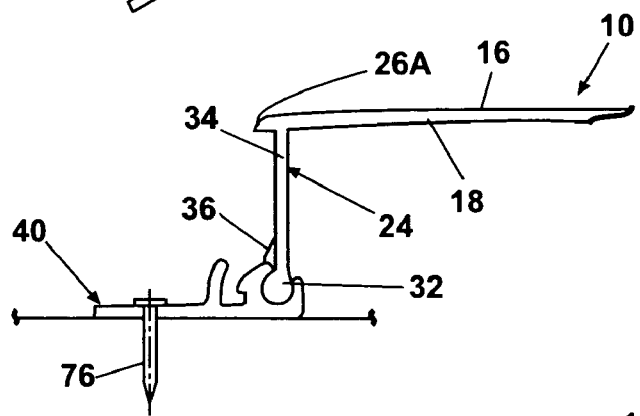
Figure 8C:
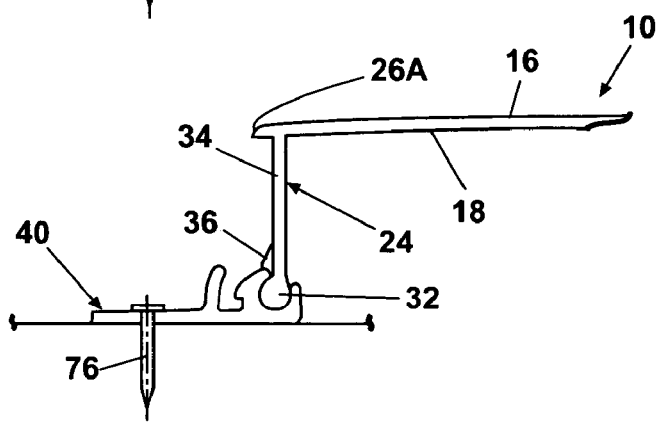
Figure 8D:
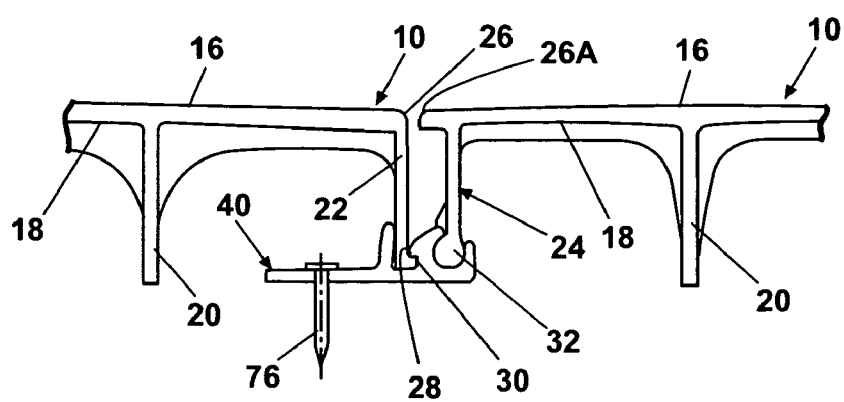

FIG. 7 illustrates one embodiment of a finished end of a plank 72 to be used at the exposed edges of the deck or flooring planks 10. The finished edge of each finishing plank 72 is provided by an end or cap wall 70 interconnecting the sidewalls 22 and 24 at one end of the finishing plank. Additional planks 72 provided with the finished end will cover the second end of the plank 10 so that both ends of a series of interconnected planks have a finished professional look. It is also contemplated that end caps or finishing planks 72 may be formed to provide angled faces 70. The range of available angled ends can be provided to cover a predetermined combination of angle orientations.

FIG. 8a through FIG. 8d generally illustrate the method for assembling a floor or deck assembly using the instant invention. A first plank 10 is initially fit with a plurality of clips 40 by positioning the longitudinal bead 32 at the end of sidewall 24 adjacent the cylindrical recess 42 in the clip 40. The bead 32 is forced into the recess 42 under pressure. The clip 40 is then automatically centered within the space between adjacent spacing bosses 36 by shoulder 50 engaging the bosses 36 and being urged into the space between the bosses. With the tab clip 40 attached to the sidewall 24, the clip 40 is placed at the appropriate location on the joist 14 so the plank 10 is properly aligned and anchored with a fastener such as one of those described above and identified by reference numeral 76. The immediately adjacent plank 10 is then positioned by inserting the sidewall 22 into the recess 46 of the clip 40 so that the shoulder 28 engages the shoulder 50. The pressure exerted against the interior of sidewall 22 by the inclined wall 48 ensures engagement of the respective shoulders to lock the sidewall 22 into clip 40 (see FIG. 8d). The lateral and longitudinal spacing of the planks 10 with respect to each other and the manner using the clips 40 provides sufficient room for expansion and contraction of the material as a result in change of temperature. Moreover, the variation in spacing between the bosses 36 along each plank 10 ensures that the distances and gaps between adjacent planks will be accommodated substantially uniformly to prevent any major gaps between the plank, or excessive buckling between the ends which would be detrimental to the appearance of the surface formed by the planks 10.

As mentioned briefly above, it is contemplated that each of the planks 10 and the clips 40 be formed from a polymeric material using conventional techniques. In a preferred embodiment, the polymeric material may be a polyurethane, polyethylene, or polyvinyl material. In some cases and applications other polymeric materials may be used to work suitably within different environments. In addition, it is contemplated that a certain crown may be formed on the upper surface 16 to improve the runoff of moisture or debris from the plank surface 16. Certainly these and other modifications would be apparent to one of ordinary skill in the art. Other modifications may also be gleaned by one of ordinary skill in the art based on this disclosure.

The above description is considered that of the preferred embodiments only. Modifications of the invention will occur to those skilled in the art and those who make or use the invention. Therefore, it is understood that the embodiments shown in the drawings and the examples set forth herein are described merely for illustrative purposes and not intended to limit the scope of the invention as interpreted according to the principles of patent law, including the doctrine of equivalents.

I claim:

1. A floor panel assembly, comprising in combination:
   a tabular sheet having an upper surface, an opposing lower surface, and interconnecting longitudinal edges terminating in a first and a second ends;
   at least two stiffening members extending from said lower surface and substantially along a length of said tabular sheet;
   a bead defined along a free end of one of said at least two stiffening members;
   a tab defined along a free end of an opposite one of said at least two stiffening members;
   a plurality of spacing bosses defined at predetermined intervals along a length of one of said bead and tab and
   a plurality of clips, each of said plurality of clips adapted to be fastened to a substrate and receive in locking relationship said bead and said tab defined along said free end of a respective one of said at least two stiffening members for holding said tabular sheet in position.

2. The floor panel assembly as defined in claim 1, wherein said bead is disposed at a free end of an outboard stiffening member and said tab is disposed at a free end of an opposing outboard stiffening members.

3. The floor panel assembly as defined in claim 1, further comprising a tapered flange extending from said first end of said tabular sheet.

4. The floor panel assembly as defined in claim 1, further comprising a finishing panel having a vertical member depending from said lower surface proximate said first end and at an angle to said at least two stiffening members.

5. The floor panel assembly as defined in claim 1, wherein each of said clips includes a dedicated recess for receiving a respective one of said bead and said tab.

6. The floor panel assembly as defined in claim 5 wherein said dedicated recess for said tab is outboard of said recess for said bead.

7. The floor panel assembly as defined in claim 5, wherein said dedicated recess for said bead is outboard of said recess for said tab.

8. A floor panel assembly, comprising in combination:
   a tabular sheet having an upper surface, an opposing lower surface, and interconnecting longitudinal edges terminating in a first and a second ends;
   at least two stiffening members extending from said lower surface and substantially along a length of said tabular sheet;
   a bead defined along a free end of one of said at least two stiffening members;

a tab defined along a free end of an opposite one of said at least two stiffening members; and a recess defined in a second end of said tabular sheet and between said at least two stiffening members;

a plurality of spacing bosses defined at predetermined intervals along a length of one of said bead and tab; and a plurality of clips, each of said plurality of clips adapted to be fastened to a substrate and receive in locking relationship said bead and said tab defined along said free end of a respective one of said at least two stiffening members for holding said tabular sheet in position.

9. A floor panel assembly, comprising in combination:

a tabular sheet having an first surface, an opposing second surface, and interconnecting longitudinal edges terminating in a first and a second ends;

at least two stiffening members extending from said second surface and substantially along a length of said tabular sheet;

a bead defined along a free end of one of said at least two stiffening members;

a tab defined along a free end of an opposite one of said at least two stiffening members;

a plurality of spacing bosses defined at predetermined intervals along a length of one of said bead and tab; and a plurality of clips, each of said plurality of clips adapted to be fastened to a substrate and receive in locking relationship said bead and said tab defined along said free end of a respective one of said at least two stiffening members for holding said tabular sheet in position, wherein each of said plurality of clips is dimensioned to fit between at least one of said plurality of spacing bosses.

10. A decking system, comprising in combination:

a plurality of decking panels adapted to be arranged in a predetermined array over a predetermined substrate, each of said plurality of decking panels including:

an upper surface of predetermined extant, an opposing lower surface of substantially equal dimension joined to said upper surface by a shared peripheral edge;

at least two, spaced apart, and generally parallel stiffening members extending from said lower surface and substantially along its greatest dimension to provide structural rigidity to said upper and lower surfaces;

one of said generally parallel stiffening members having a bead defined along a free end thereof, and an opposite one of said generally parallel stiffening members having a projection defined along a free end thereof; and a plurality of clips, each constructed to be rigidly fixed to the substrate and having at least one member along an upper surface thereof for receiving one of said bead and said projection defined at said free end of each of said stiffening members and retaining each of said plurality of decking panels in position on the substrate; and a plurality of spacing bosses spaced at predetermined intervals along one of said bead and said projection, said predetermined interval sufficient to receive at least one of said clips there between.

11. The decking system as defined in claim 10, further comprising a third stiffening member extending from said lower surface of each decking panel and positioned intermediate said at least two stiffening members.

12. The decking system as defined in claim 10, further comprising a tapered flange extending from one end of said decking panel.

13. The decking system as defined in claim 10, wherein each of said plurality of clips are constructed to be rigidly fixed to the substrate using one of a nail, a screw, a rivet, a bolt, an adhesive, a clamp, and a pinch flange.

14. The decking system as defined in claim 10, wherein a height of said at least two stiffening members is reduced from that of additional stiffening members by a thickness of one of said clips.

15. The decking system as defined in claim 10, wherein said at least one member on each of said clips further comprises a dedicated member for receiving one of said bead and said projection.

16. A decking system comprising in combination:

a plurality of decking panels adapted to be arranged in a predetermined array over a predetermined substrate, each of said plurality of decking panels including:

an upper surface of predetermined extant, an opposing lower surface of substantially equal dimension joined to said upper surface by a shared peripheral edge;

at least two, spaced apart, and generally parallel stiffening members extending from said lower surface and substantially along its greatest dimension to provide structural rigidity to said upper and lower surfaces;

one of said generally parallel stiffening members having a bead defined along a free end thereof, and an opposite one of said generally parallel stiffening members having a projection defined along a free end thereof;

a plurality of clips, each constructed to be rigidly fixed to the substrate and having at least one member along an upper surface thereof for receiving one of said bead and said projection defined at said free end of each of said stiffening members and retaining each of said plurality of decking panels in position on the substrate; and a recess defined within one end of said decking panel between said at least two stiffening members for receiving an end of another one of said decking panels.

* * * * *